Jan. 31, 1967  A. W. HUGHES  3,301,291
FROZEN MEAT CUTTER
Filed Aug. 31, 1964
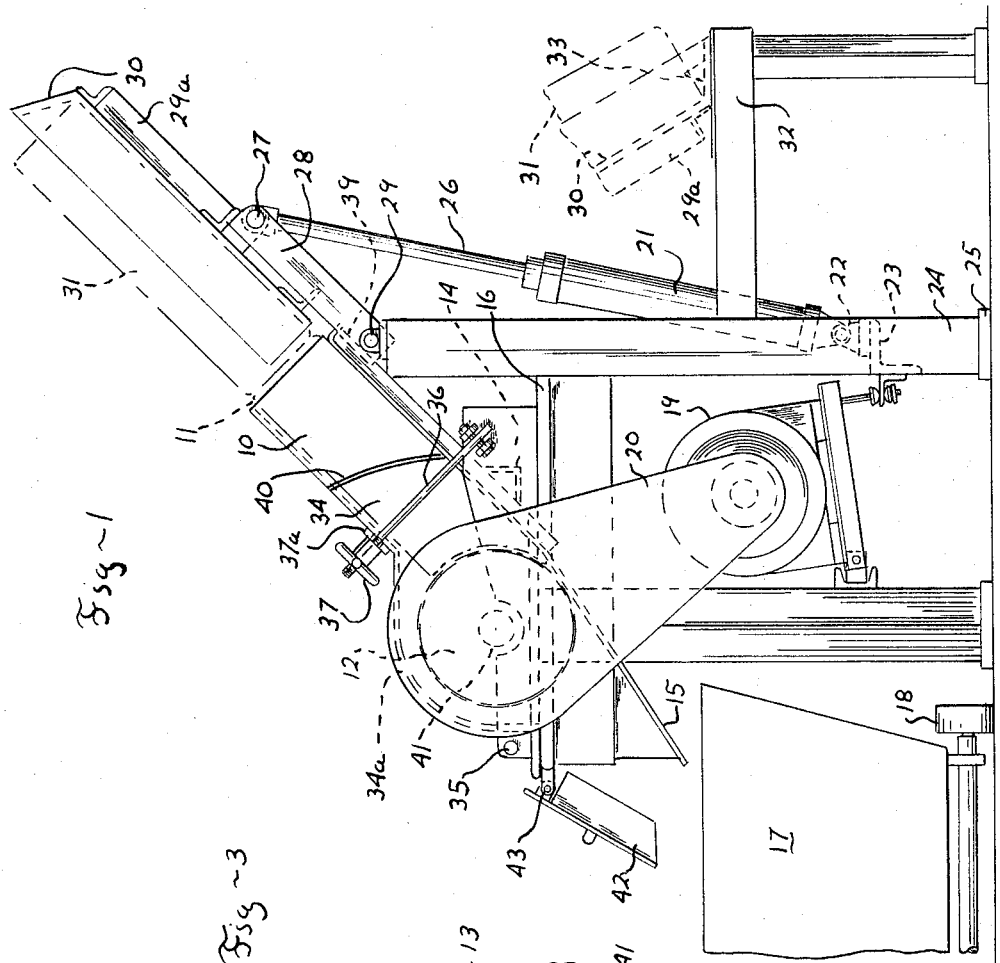
Fig ~1
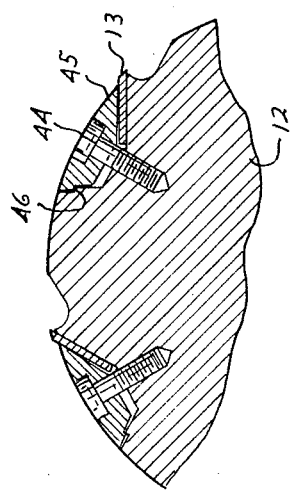
Fig ~3
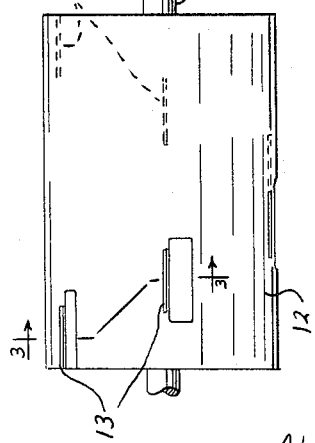
Fig ~2
INVENTOR.
Alvin W. Hughes
BY H. R. Johns
Attorney

United States Patent Office 3,301,291
Patented Jan. 31, 1967

3,301,291
FROZEN MEAT CUTTER
Alvin W. Hughes, 4 N. 194 Church Road,
Bensenville, Ill. 60106
Filed Aug. 31, 1964, Ser. No. 393,080
11 Claims. (Cl. 146—123)

This invention relates to a cutter for frozen meat blocks of the sort which are usually cut up into smaller pieces before being fed to a sausage meat chopper, meat grinder, or other supplemental sausage manufacturing equipment.

An object of this invention is to determine the best speed of operation for such a cutter that must handle both low temperature meats and those which are at a higher temperature though still frozen, inasmuch as the lower temperature block is more brittle than those frozen to a less low temperature.

Another object is to provide such a frozen meat cutter which which operates with less noise and less vibration than is frequently encountered, and which is capable of operating upon 6,000 pounds per hour more nearly effortlessly.

Yet a further object is to provide such a cutter which is more compact in requiring less floor space as well as less overhead space, and which requires less inoperative time for cleaning.

Another object is to provide a cutter for frozen meats which requires almost no maintenance.

Still another object is to provide a cutter of this type in which the cutting knives are less likely to become loosened or out of order if engaging hard bones, which might on occasion be found in a block of frozen meat.

It is known that meat blocks at a temperature of zero degrees F. are more brittle than the frozen blocks having a temperature of about 28 degrees, but so far as is known, no one has determined the best speed of operation for both temperatures without having to change the knife rotor to a lower desirable speed for cutting a lower temperature meat block which is a brittle product that shatters at a higher speed, for the less brittle meat block capable of being cut at a faster rate. It has now been determined that a speed of about 500 revolutions per minute or linear velocity of about 1830 feet per minute is the best compromise in efficiency for the brittle blocks and also the less brittle ones. This fact, together with the more attractive, salable and compact cutter has made possible a volume of about 6000 pounds of frozen meat cut per hour with less work on the part of the operator. This new machine for cutting blocks of frozen meat requires less time out of operation for cleaning by about 50% as compared with prior, competitive commercial machines. Finally the cutting knife blades have been mounted in a stiffly yieldable manner so that their engagement with hard bones or other foreign matter will prevent loosening the clamping bolts holding these knife blades in their adjusted position.

Referring to the drawing:
FIG. 1 is a side view of the present improved machine for cutting frozen meat blocks.

FIG. 2 shows a front view of the rotor removed from the machine to illustrate the knife arrangement for cutting.

FIG. 3 is a partial section on the line 3—3 of FIG. 2 showing the knife clamping arrangement and the circumferential placement of knives at 60 degrees apart.

As shown in FIG. 1, a guide casing 10 is arranged at about a 45 degree incline down which a block 11 of frozen meat may be fed by gravity to a rotor 12 carrying a series of cutting blades or knives 13 projecting out from the rotor periphery from 1/16 to 1/4 of an inch depending on the size or thickness of the cut desired. The frozen meat blocks are between about 60 to 120 pounds in weight with the larger size around 8 inches in thickness and slightly less in width than the 21¼ inches in axial length of rotor 12. The drawing FIG. 1 shows how the knives initially engage the block at about 90 degrees to a surface to be cut. These knives continue cutting for well over 60 degrees, which is the angular displacement between successive knives so that some one or two knives are always in operation on the larger sizes of blocks to be cut. This means less initial impacts and less noise and vibration. To withstand the initial impact of a knife upon the frozen meat block, the metal base 15 of the guide casing 10 is provided with a suitable reinforcing member 14 to withstand the impact of the initial knife engagement. Thus at no time does a knife ever tend to push the block 11 away from the rotor. Instead after the initial cut the knife tends to pull the block toward the rotor as may be seen from the dotted curve line in FIG. 1 representing the end of block 11.

After a knife blade leaves its slicing, shredding, chipping, or cutting operation, it imparts a slight push to the material that has been cut from the block 11 on the almost 45 degree slope which is sufficient to enable gravity to carry the cut material down the smooth base 15 and between the sides of the guide-way below the top of table 16 for discharge into the receptacle 17 mounted on wheels 18 and standing outside the front legs of the table. This wheeled receptacle is common in the trade and may be of rectangular, circular, or other desired cross section.

Beneath the top of table 16 is mounted a motor 19 driving the rotor 12 through a belt or other flexible tension member within the enclosure 20 located outside a bearing for the shaft of rotor 12. Though no part of the present invention, the motor is mounted on a platform pivoted at its left or front side and supported at its right or rear side on a threaded stem supported from an angle iron 23 extending between the rear table legs, the motor thus being adjustable in height by a nut above and below a projection from this angle iron for ease in controlling the tension in the belt.

Also pivotally supported at 22 from this same angle iron 23 is an air or other fluid pressure cylinder 21 in which slides a piston or plunger moving rod 26 pivoted at 27 to a lever 28 pivoted at 29 for guiding the movement of the loading tray 30. Only the rear table legs 24 have been numbered but both the front and rear legs are preferably tubular structures integrally connected at their base by transverse flat strips 25 illustrated for rigidity. A loading step 32 at a convenient height below the top of table 16 enables the tray 30 to be swung about its pivot 29 to the dotted position indicated for its end, for ease in loading the tray with a second block 31 of frozen meat. In the lower position for the tray, its end remote from pivot 29 is provided with one or more prongs 33 adapted to engage block 31 and prevent the frosted and slippery outer surface from causing the block to slide out of tray 30. As shown in FIG. 1 the second block 31 may be fed into the guide casing as the first block 11 being cut moves forward by gravity and the action of each cutting blade during the later part of its cutting path. In this way the second block assists the first in being fed forward by gravity, thus increasing cutting capacity.

The sides 34 and top of a large portion of the guide casing 10 together with a cover 34a for the cutting rotor 12 are integral and pivoted at 35 to swing in a counterclockwise direction for opening to provide access for cleaning the rotor 12, its knives 13, and inner surfaces of the guide casing including its top, sides, and base 15 or bottom. For holding the cover 34a and the top and sides 34 of the guide casing in closed position, a pair of bolts 36 on opposite sides of the guide casing are each pivoted at their lower ends and provided with wing or other convenient forms for hand operated nuts 37, which may be quickly removed to enable the bolts 36 to be swung aside and the notched clamping strip 37a removed before the top and sides 34 of the guide casing and the cover 34a for the rotor 12 is swung open. The base 15 of the guide casing is preferably a unitary sheet of polished stainless or other metal, provided with a bent upper end flange 38 to engage a stationary projection 39 that does not move with the movement of the loading tray 30. The swinging of the sides and top 34 of the guide casing with the rotor cover 34a may include the full length of these portions of the guide casing, or the forward part of the top and sides 34 of the guide casing with the rotor cover 34a may include the full length of these portions of the guide casing, or the forward part of the top and sides 34 may be moved and only an uppermost portion may not be moved. In this latter event, the sides and top of the guide casing may be separable along the line 40, in which case the abutting edges of the sides and top have a snug fit to preclude emission of any finely divided particles of frozen meat getting through any crack formed. Still better the sides and top of the stationary portion of the guide casing 10 may be in two plys or layers with the inner layer extending forward and downward far enough to bridge any opening when the end edges of the stationary and movable parts do not tightly fit.

The shaft 41 of the rotor 12 is mounted in bearings fixed to the top of table 16 inside the belt casing 20 and its sheave.

The discharge end of guideway 15 for cut meat, including its base and sides is closed when not in use by a gate or closure 42 pivoted at 43 and biased to a closed position by a helical spring around its hinge pin, yet able to open under the weight of any substantial quantity of cut meat moving down the guideway for discharge into the receptacle 17.

In FIG. 3 is shown the novel type stiffly yieldable cutting knife clamp in which there is less tendency for the knives 13 to work loose. The usual clamp for a cutting blade has the full width of the blade clamped uniformly, but in the present invention the maximum clamping pressure is applied close to the cutting edge and the clamping member 45 is made very slightly yieldable in event an unusually hard bone is encountered. This is shown in the partial section through the rotor 12 in which the clamping member 45, in FIG. 3 is held tightly in place by a high tensile strength cap screw or bolt 44 extending into the body of the rotor. Clamping member 45 has its sides tapered to an angle of about 45 degrees to the bolt axis. On the left side of member 45 is formed a ledge or step 46 about which member 45 may tilt slightly. The bottom of member 45 contacting knife blade 13 is not shaped to contact the full width of the blade from front or edge to rear uniformly. Instead the maximum clamping action is placed near the cutting edge because when encountering any hard material it is the cutting edge which tends to be moved away from its fixed abutment, i.e. the right or lower one (in FIG. 3) and the non-adjustable abutment against which it is clamped. To attain the desired result of maximum clamping near the edge, the contiguous surface of member 45 is not made exactly parallel to the blade and fixed abutment but instead is given a 1 degree taper away from its radially outer edge. With an unusually strong bolt 44, on tightening such bolt the tip of member 45 adjacent the cutting edge then becomes flexed slightly radially outward allowing more of the blade surface to be clamped. In this movement of member 45, it tends to be swung around the step or ledge 46. Thus the clamping member 45 acts as its own locking device.

Among the advantages of this invention may be mentioned the discovery of the best cutting rate to adapt the cutting for both the most brittle block encountered as well as the higher temperature blocks without the necessity of any speed change mechanism. At a speed of about 800 r.p.m. the brittle block tends to shatter producing fines which are undesirable. At this cutting rate of 800 r.p.m. the results are good for the higher temperature meat but are unsuitable for the more brittle, colder meat blocks. Here the motor speed, and sheave sizes are adapted to give the 500 r.p.m. comprise speed for the usual meat blocks encountered, between zero degrees F. and 28 degrees F. The use of 6 knives spaced 60 degrees apart gives less noise and less vibration. Maintenance costs are reduced. It has been conservatively estimated the shut down time necessary for thorough cleaning has been reduced about 50% when compared with a competitive commercial machine.

The front to rear distance has been shortened to about 5 feet with the motor being located under the table 16 and receptacle 17 not being filled from a position between the table legs but now being located in front of the table. This machine beside being compact has been time tested and found capable of cutting a 100 pound meat block in 35 seconds. The vertical space required for this machine has been shortened to require no more than about 6 feet 4 inches from the floor to a filled tray's highest point as shown in FIG. 1. About an eighth inch extension for the cutting edge of the knives beyond the periphery of rotor 12 has been found an approximate average distance for the knives and the amount of cutting desired. These knives get a better bite into the hard frozen blocks with less shatter and fines at a speed at and below the 500 r.p.m. selected. Each cutting edge needs to be slightly over 3⅝ inches long inasmuch as the axial length of cut should be sufficient to have a slight overlap in the knives to avoid any uncut ribs being left when the rotor axial length is about 21¼ inches. The knife 13 is about 1¾ inches wide and about .218 inch thick.

Instead of feeding the cut meat into the receptacle 17 it may instead be fed directly into a usual sausage meat chopper or meat grinder to its movement into and through an emulsifier. An approximate scale of one inch equals about 10.3 inches is used for FIG. 1 and about 1 inch equals 8 inches is used for FIG. 2. The cylinder 21 may be either single or double acting although the latter is quicker.

Upon releasing the nuts 37 from bolts 36 and swinging the sides and cover 34a about pivot 35 the entire apparatus and its complete inner surfaces are made quickly available for cleaning, which is an important feature of this invention enabling the user of this invention to save much time in making the necessary cleaning.

Where headroom is available over the input open end of the guideway, the loading tray need not necessarily be movable but instead may be fixed and shaped to guide and feed more than the one or two frozen meat blocks shown into the rotary cutting knives. The longer such an open and inclined feed path is provided, the greater will be the weight of the frozen meat blocks pressing the lower one of them into the cutter. In this latter event the blocks may be loaded by a conveyor from above it, although fluid pressure cylinder 21 may still be used but located higher and further back from the cutting knives. The gravity feed of the blocks of frozen meat to the cutting knives has been found superior to either manual or mechanical pressure forcing them against the rotating knives. The reasons therefor are not fully understood but simplicity is one of them.

I claim:

1. A frozen meat cutter having a rotor from which cutting knives project, a motor for driving said rotor, a table on which said rotor is mounted, a guide casing inclined at an acute angle above a top of said table for directing a block of meat to said rotor, the upper end of said guide casing being open, a bottom portion of said guide casing being reinforced to withstand the thrust of said cutting knives upon a meat block in said guide casing, at least a substantial portion of the sides and cover of said guide casing and cover for said rotor being unitary and pivoted to said table on a side of said rotor generally opposite said guide casing for opening and cleaning of said rotor and guide casing, quickly detachable means whereby said unitary rotor cover and guide casing cover may be clamped in closed position, a loading step secured to said table at an elevation below a top of said table, a loading tray movable between said step and an elevated position enabling a meat block to be guided into the open end of said guide casing, means for raising and lowering said tray, said motor being mounted below said table top, a flexible drive connection between said motor and said rotor, and an inclined chute open at the top end thereof to receive cut meat from said rotor knives and extending in prolongation of said guide casing to an edge of said table for directing cut meat into a receptacle located outside and below said table, said rotor knives pushing the cut meat down said chute.

2. A combination according to claim 1 and including said loading tray being pivotally secured adjacent an upper end of a near-by table leg projecting above the said table top and below the upper end of said guide casing, a fluid pressure oscillatable cylinder and piston for raising said tray by swinging said tray about its upper pivotal connection, a piston rod connected to said piston in said cylinder and to said tray adjacent its longitudinal midportion whereby said tray may be lowered with its outer end contiguous said step and raised by said cylinder to a position of alinement with said guide casing for sliding a meat block into it.

3. A combination according to claim 2 in which each knife is clamped in position by a block whose sides form an angle of approximately 90 degrees, a cap screw having a head portion radially within said block, extending into said rotor, a pivotal ledge formed in a side of said block, and a step or ledge supporting portion of said rotor, the knife clamping side of said segmental block having a taper of about 1 degree from parallelism with a side of a knife clamped thereby, whereby maximum clamping pressure by said segment against said knife exists closely adjacent a cutting edge of said knife.

4. A combination according to claim 3 in which the outer knife clamping side of said block is tapered and is more yieldable adjacent the knife edge under pressure of said screw than is the screw itself.

5. In a frozen meat cutter of the type having a table, a rotor provided with cutting knives engaging a block of frozen meat and mounted on said table, a guide casing mounted at an acute angle to a top of said table for receiving and guiding a block of meat to said rotor knives, a loading step at a rear portion of said table, an elevator for raising a block of frozen meat from said step to an open upper end of said guide casing, means for operating said elevator, and means for delivering cut meat from said block to a receptable located outside said table, the combination therewith of the improvement for reducing the time for raising and lowering said elevator from said loading step to an elevated position in alinement with said guide casing and back again to said step, said improvement including a fluid pressure cylinder and piston, the cylinder being pivoted adjacent a rear portion of said table below said step and between rear legs of the table, a tray supporting lever pivoted adjacent an upper portion of rear table legs extending above the top of said table and a piston rod extending from said cylinder to said lever in rear of said first mentioned lever pivot location, said tray in its upper position being alined with said guide casing to allow a frozen meat block to slide by gravity into said guide casing when empty and when not empty to enable gravity acting upon a newly raised block to assist a block within said guide casing to be fed forward toward said rotor and its cutting knives by the combined weight of the blocks.

6. A combination according to claim 5 in which a source of compressed gas is connected to said cylinder with valve mechanism for supplying gas to said cylinder and venting gas from said cylinder, whereby a loaded tray may be rapidly raised for sliding a meat block into said guide casing, said piston rod being pivotally connected to said tray forward of a center line of said tray and parallel to a rotational axis of said rotor, and in which the chute base extends up into said guide casing and is secured adjacent the input end by a downturned flange.

7. A combination according to claim 4 in which said motor and rotor are each provided with a pulley over which passes a flexible tension member located on a side table generally parallel to said guide casing, the sizes of said pulley being correlated to the motor speed to provide a linear speed of about 1835 feet per minute for the rotor knives to have results which are suited to meat blocks having a temperature between about zero degrees F. and 28 degrees F. from the standpoint of minimum fines and loss thereof at the lower temperature and the desirability for more efficient speeds at the higher temperature.

8. In a rotary tool having a rotor body and cutting knife clamped thereto by a bolt, the combination therewith of the improvement for reducing the shock of impact of such a knife engaging a hard material to be cut and reducing the tendency for such a bolt to become loosened, said improvement comprising a clamping block having its sides tapered at approximately 90 degrees to one another and engaging said knife, said bolt and its clamping block being of a material having a substantially higher elastic limit than does said rotor body and a side of said clamping block opposite said knife being provided with a ledge engaging a cooperative ledge in said rotor and about which said block may pivot in clamping said knife, the side of said block contiguous said knife having a gradual taper from adjacent a knife edge and from parallelism with a contiguous side of said knife, whereby on tightening said bolt the knife is clamped more tightly adjacent its cutting edge and with decreasing clamping pressure away from said edge depending on the yieldability of said block to flexure, the radial thickness of said block being about a third its maximum angular length.

9. The combination with a motor driven rotor having a cutting knife projecting therefrom, a clamping member for said knife, a bolt passing through said clamping member and into said rotor, said clamping member having its sides tapered and of maximum thickness adjaent a knife cutting edge, a side of said member opposite that contiguous said knife having a supporting and pivotal ledge, a step on said rotor supporting said ledge and about which said member is pivotally movable as said bolt is tightened clamping said knife against said rotor, the taper to the side of said member contiguous said knife having a gradual taper away from parallelism with said knife and a rotor surface against which the knife abuts, whereby said knife is subject to maximum clamping pressure adjacent but slightly back of its cutting edge and on tightening said bolt the clamping member is flexed most adjacent the knife edge where said member is of minimum thickness and on further tightening said bolts the full width of said knife may be clamped but not under uniform pressure, the maximum clamping pressure remaining near the knife edge and gradually decreasing away therefrom, whereby said clamping member functions as its own locking device against said bolt working loose.

10. In a frozen meat cutter having rotating cutting knives, a table on which said knives are mounted, a motor supported by said table, a flexible tension driving connection between said motor and cutting knives, a guideway having an open upper end through which frozen meat blocks may be supplied to said knives, the guideway being inclined to said table at an angle for gravity to assist in the feed of a block of frozen meat to said knives and a substantial continuation of said guideway below said knives for discharging particles of the cut frozen meat to a receptacle under the influence of both gravity and a push imparted thereto by rotation of said knives, the combination therewith of the improvement whereby down time for cleaning may be shortened, said improvement including at least a substantial length of said guideway above said knives, and an enclosure for said knives being structurally integral, and secured together for opening movement for cleaning and a quickly detachable connection for holding said pivotal parts in closed position during operation of said knives, and a pivot secured to said table on a side of said knives opposite said guideway above said knives.

11. A frozen meat cutter according to claim 10 comprising a tray shaped to feed a block of frozen meat into said guideway and of a size to support at least one block of frozen meat into said guideway in addition to one already carried thereby whereby the weight of more than one frozen meat block may, by a component of gravity, feed a block into said knives when said knives are mounted on a rotor to assist the gravity feed of a block into the cutting knives.

No references cited.

WILLIAM W. DYER, JR., *Primary Examiner.*

J. M. MEISTER, *Assistant Examiner.*